Figure 1:
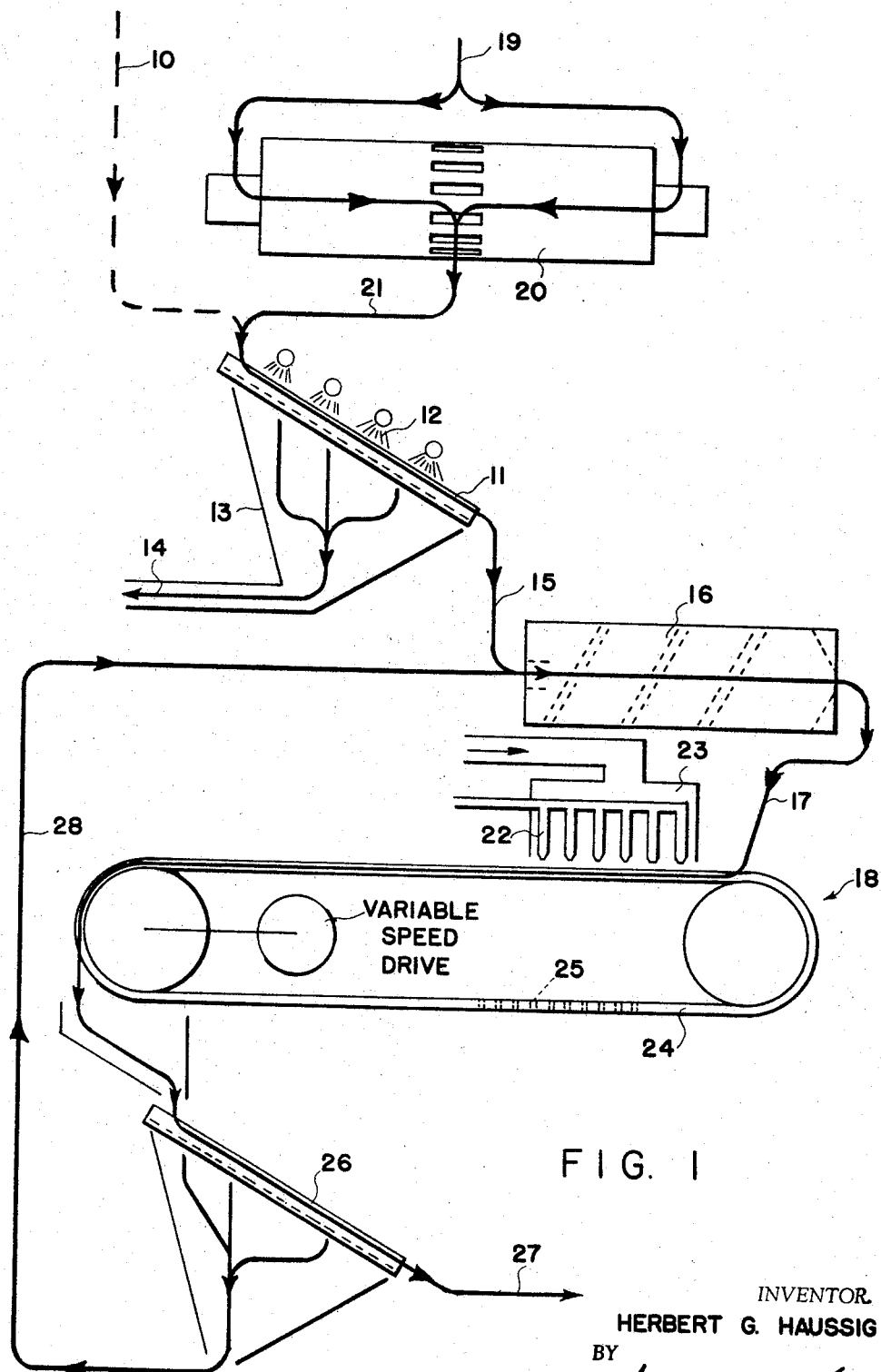

United States Patent Office 3,330,644
Patented July 11, 1967

3,330,644
METHOD OF TREATING SOLIDIFIED STEEL-MAKING SLAGS FOR THE RECOVERY OF Fe VALUES THEREFROM
Herbert G. Haussig, Butler, Pa., assignor to Harsco Corporation, Harrisburg, Pa., a corporation of Delaware
Filed Oct. 1, 1964, Ser. No. 400,838
8 Claims. (Cl. 75—5)

This invention relates to an improved and practical process for concentrating ferrous values in solidified slags resulting from steel-making operations and for working said values into a physical form more suitable for reuse in steel-making furnaces or vessels. The generally practiced processes to recover Fe values from steel-making slags employ a combination of impacting the material to liberate the metallics Fe from adhering slag and subsequent screening—assuming that by impacting, the slag has been reduced more in size than the metallics Fe and magnetic concentration of the smaller sizes containing metallic Fe and Fe oxides. Other processes employ magnetic concentration and screening alone taking into account that in some plants the hardness of the slag is such that impacting does not sufficiently break the slag to obtain an adequate separation by subsequent screening only.

The more valuable material produced in these processes consists generally of +3″ size scrap containing more than 80% of essentially metallic Fe, a material well suited for usage as scrap charge in steel-making furnaces or vessels. In steel mill operations which have blast furnaces, the ½″ x 3″ size fraction with about 60% mostly metallic Fe can be utilized in said blast furnaces. In steel-making facilities where a sinter plant is part of the production facilities, the minus ½″ concentrate with from 40 to 60% Fe can be mixed into the fine ore at the sinter plant and therefore utilized.

However, at a number of steel-producing facilities either the blast furnace and sinter plant operators reject the relatively largely contaminated minus ½″ and ½″ x 3″ Fe concentrates or blast furnaces and/or sinter plants are not part of the facilities. In that case, a substantial amount of Fe values are stockpiled as waste in form of such —½″ or ½″ x 3″ or minus 3″ materials, which in most cases are produced as a matter of fact when producing +3″ scrap or are produced and stockpiled with the hope that future uses can be found.

The object of this invention is the development of a process or processes to utilize all or a portion of the minus 3″ Fe concentrates in steel-making furnaces or vessels through a combination of milling, screening and agglomeration to a size suitable for use in such furnaces or vessels.

Another object of this invention is a process by the means of which the Fe concentration of the final product can be varied to a predictable degree by simple changes of some processing steps which will become clear when the process is described in detail later.

Another object of this invention is a process of agglomeration of Fe bearing materials by which the elimination of a certain fine size fraction containing most of the unwanted impurities, a material of such a size can be produced to make it suitable for charging into steel-making furnaces or vessels. An ancillary object of the invention is to provide an agglomeration process which is simple, direct, and efficient to the point that the process is economically feasible in the day-to-day operation of its steel-making plant. This aspect of the invention is based on my discovery that given a reasonable and readily obtained proportion of metallic concentrates in a ferrous-slag burden and with all extremely small particle sizes removed, efficient agglomeration may be obtained in a more or less conventional sintering plant having adequate control as will be hereinafter specified. Granular slag particles are somewhat inherently adhesive and if their particle size is such as to admit of the rather free passage of air through a burden of the same an agglomerated mass may be sintered together by the application of a reasonably low ignition temperature provided, of course, that the particles are sufficiently high in metallic Fe concentrates to present closely spaced metallic interfaces. In accordance with the principles of my invention, no coke or other fuel is added to the burden but, rather, the additional required heat is furnished exothermically by the rapidly oxidizing iron, the process being touched off by a somewhat elongated ignition time and being made possible, of course, by the aforesaid regulation of the size and spacing of the voids in the burden.

The above and other objects and advantages of the invention will become apparent upon consideration of the following specification and the accompanying drawing wherein there is disclosed certain preferred embodiments of the invention, and examples of the practical application of the invention.

Figure 2:
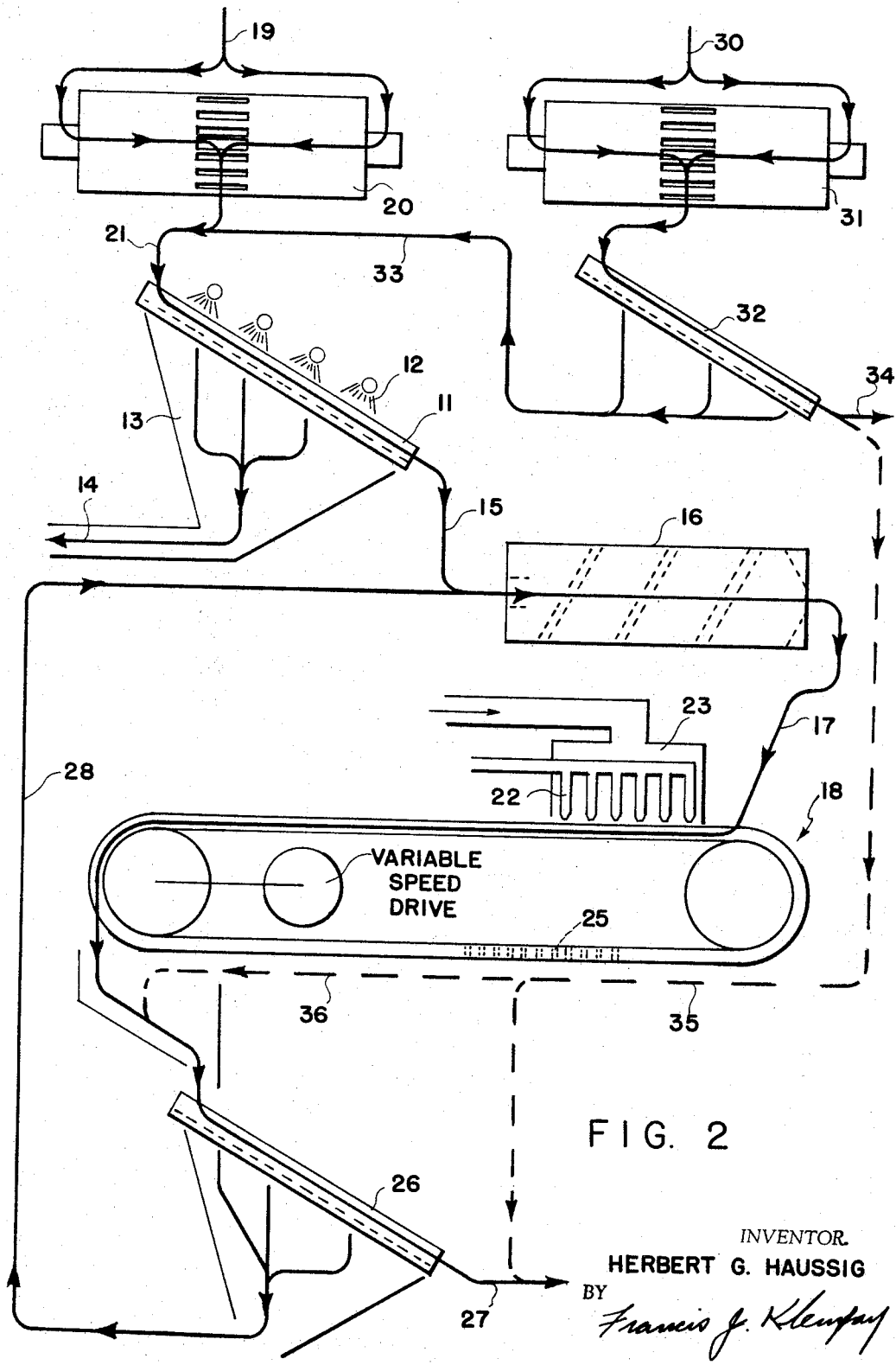

In the drawing:

FIGURE 1 is a schematic showing of a physical plant which may be used to carry out the process of my invention when dealing with slag fines of less than one-half inch in size and which may contain both metallic and oxidized iron in proportions sufficient to warrant the treatment of the burden; and FIGURE 2 is a schematic showing a physical plant similar to FIGURE 1 but modified to efficiently handle a burden of the above described materials which may range up to 3″ particle size.

Before proceeding with a more detailed exposition of the principles of this invention, it should be understood that the raw material to be processed is normally one which has been at least partially concentrated as to its metallic and magnetic oxide content. This material may, for example, be a product or products of the plant and procedures described in United States Patent No. 3,081,954 issued March 19, 1963, to Eric H. Heckett. Considering first the process and apparatus of FIGURE 1, analysis of a representative raw material burden shows distribution of the ferrous values as follows:

| | | |
|---|---|---|
| 1.1%=—100 mesh, 21.56% | Total Fe, .83% | Metallic Fe. |
| 31.0=100 x 10 mesh, 45.64% | Total Fe, 7.84% | Do. |
| 3.8%=8 x 10 mesh, 68.04% | Total Fe, 32.76% | Do. |
| 19.4%=4 x 8 mesh, 74.48% | Total Fe, 38.64% | Do. |
| 38.1%=⅜″ x 4 mesh, 82.04% | Total Fe, 29.68% | Do. |
| 6.6%=½″ x ⅜″, 74.76% | Total Fe, 25.48% | Do. |
| 100%=—½″, 67.6% | Total Fe, 24.2% | Metallic Fe. |

A study of the above distribution will readily show that in the dust of the burden as well as in the smaller granular sizes thereof not only is the total ferrous content low but that also the metallic fraction is extremely low. However, these small fines make up an appreciable portion of the weight or bulk of the burden. They would pose serious difficulty if included in the burden at the time of agglomeration or sintering since they contribute nothing to the process and would only serve to clog the bed thereby forming insulation and impeding the flow of air and hot sintering gases which is necessary to effect ignition of the metallic Fe and/or FeO to provide sufficient heat to economically sustain the process.

In FIGURE 1, the dotted line 10 represents a feed conveyor along which moves a stream of raw material burden which may be of the composition above stated. Conveyor 10 discharges onto a screen 11 whereon with the aid of water sprays 12 and power-shaking of the screen all the smaller fines of a range of minus 8 mesh are caused to fall through for collection in a hopper 13 and discharged through an exit conveyor 14. All the overs from screen 11 pass along conveyor 15 to a rotating mixing tumbler 16 from which they are discharged along path 17 onto the moving strand or hearth of a sintering machine shown schematically at 18.

Obviously, the concentration of ferrous values in the material passing along conveyor 15 and originating on the conveyor 10 will be a composite of the values inherent in the larger size fractions passed by the screen 11. To vary (increase) this degree of concentration I provide a parallel path for the flow of raw material onto the screen 11, and this parallel path comprises a conveyor 19, rod or ball mill 20, and a conveyor 21. In the mill 20 the larger size fractions of the raw material is processed in the sense that much encrusting slag is spalled and impacted off discrete particles of metal and metallic oxide thus in effect cleaning these discrete particles which are in themselves high in ferrous content. Thus, more of the non-ferrous component falls through the screen 11 for discard at 14, thereby raising the ferrous concentration in the material which goes to the sintering equipment.

By reason of the discarding of most of the smaller fines—below 8 mesh, for example—from the incoming raw material the bed built up on the sintering machine 18 is rather porous for the unimpeded passage therethrough of the ignition gases and excess air needed for the oxidation of the metallic iron. This gas and air may be furnished by a burner or a series of burners 22 as shown on the drawing and, if desired, additional secondary air may be furnished under pressure through a shroud 23. Also, the strand or moving hearth 24 of the sintering equipment 18 is perforated as shown at 25 or is of the open mesh kind so that the ignition gases and air can readily penetrate through the moving material bed which is deposited on the strand or hearth.

In accordance with the precept of this invention which deals primarily with economics, the success of the invention is dependent on the derivation of the sintering heat from burning or oxidation of some of the metallic values which come on to the hearth 24 thereby keeping the fuel requirements of the burners 22 to a practical minimum. In actual practice, I prefer to limit the temperature of the ignition gases issuing from the burners 22 to a fairly narrow range above 1800° F.—1800° F. to 1900° F., for example—which allows the use of readily available and inexpensive gaseous fuels. These relatively low temperatures require ignition periods somewhat longer than are commonly employed in high-productive sintering equipment, and I propose to make such adjustment by either increasing the length of ignition zone through addition of more burners or by employing a variable speed drive for the sintering strand or hearth as indicated on the drawing.

The prior sintering art specifies ignition temperatures of the order of 2000 to 2500° F. with relatively rapid destructive wear of the parts of the sintering equipment, especiallly the burners. By keeping the ignition temperatures lower, the equipment is much more maintenance-free, longer-lifed, and consequently cheaper to operate. Although the ignition time must be prolonged somewhat in the practice of my invention, this is of no particular disadvantage since tests indicate that a range of from 2 to 6 minutes is sufficient which still allows for the practical design and operation of the equipment. The length of ignition time depends on the amount of metallic Fe or FeO contained in the material.

The combustion of the metallic Fe and FeO to $Fe_3O_4$ or $Fe_2O_3$ provides sufficient heat—without addition of outside fuel to the burden—to fuse or weld together enough of the interengaging metallic faces to establish a "sinter-cake" which later breaks up into fairly large pieces when discharged from the equipment. All this is made possible by the above outlined selective preparation of the raw material and the presence of substantial amounts of metallic Fe in the retained burden.

From the sintering machine 18 the material breaks up into fairly large pieces upon discharge therefrom and falls onto a shaker screen 26 which may be sized to allow overs of $+2''$ to pass onto conveyor 27 as the completed product while the $-2''$ fraction is returned via conveyor 28 to the mixer 16 for rerun through the equipment. The end product is characterized by adequate strength and abrasion resistance which makes it easy to handle and most suitable for recharging in a steel-making furnace or vessel. While some loss of metallic Fe occurs in the sintering process the total Fe concentration remains of the order of 65% by weight even when all the incoming material is derived from source 10. In such case the concentration in conveyor 15 may be of the order of 79% Fe. This concentration in conveyor 15 may readily be increased to 87% by using the mill 20 and in this case the final product will have an Fe concentration of the order of 78%.

The embodiment of the invention illustrated in FIGURE 2 is useful when it is desired to process a burden having a particle size up to 3" and wherein it is desired to produce an end product of exceptional quality as regards metallic Fe concentration. Since most of the process and apparatus of FIGURE 2 is identical to the process and apparatus of FIGURE 1, all common components have been designated with the same reference numerals and operate in the manner described in connection with FIGURE 1. Thus, conveyor 19 is intended to take all fines of the incoming burden of less than ½" size, and this material, after being ground or impacted in the mill 20 is deposited onto the screen 11 where the —8 mesh component is removed, allowing the 8 mesh to ½" material to go to the mixer 16 and thereafter to the sintering equipment.

The $+½''—3''$ portion of the incoming burden enters the plant of FIGURE 2 along a conveyor 30 and is first processed in a rod or ball mill 31. This larger size material will commonly have a Fe concentration of about 50 to 60% which is mostly in metallic form—nuggets of iron and steel being embedded in or contaminated with adhering slag. Further concentration of this material by magnetic means would only result in losses of Fe values without substantially increasing the Fe concentration. However, material advantages accrue from the association of the processing of this larger size material with the smaller fines as will become apparent hereinafter.

The product of mill 31 is fed onto a shaker screen 32 where the throughs of $—½''$ are collected and fed along conveyor 33 onto the screen 11 in mixture with the product of mill 20. Much of the encrusting and contaminating slag is removed from the metal pieces and pulverized in the mill 31 so that the overs from screen 32 have a very high degree of Fe concentration—of the order of 88%, for example, mostly metallic. This material may be removed as an end product by conveyor 34 for use as high quality scrap in any blast furnace steel-making furnace or vessel. Alternatively, this material may be fed along conveyor 35 and combined with the overs from the 2" screen 26 at the conveyor 27. However, to increase the particle or lump size of the final product the overs from screen 32 may be diverted from conveyor 35 onto a conveyor 36 which discharges onto the 2" screen 26. Since these overs from screen 32 are high in metallics, as above indicated, utilization of the —2" fraction thereof in the mixer 16 and thus in the sintering machine 18 is highly advantageous in promoting the welded adhesion of the sinter because of over-all increase in the number and size of the metallic interfaces on the sintering hearth or strand. When operated in this manner the final product of the process has greater physical strength and may readily reach a Fe concentration of approximately 80%. Similar results may be obtained, of course, by varying the process whereby the screen 32 will pass larger particles, these larger particles finding their way across screen 11, through mixer 16 and into the sintering machine. Thus, the plant may be operated flexibly to equalize the load on the various equipment items.

The arrangement of FIGURE 2 readily permits, if desired, the processing of only the ½ to 3" fraction of the total incoming burden to produce 2" to 3" product which is mostly metallic and a 2+ sinter having Fe concentration of the order of 80%. Both these materials are quite valuable for recharging in a steel-making furnace or vessel.

The processes herein described lend themselves to practice in plants which are operated continuously whereby a minimum amount of equipment is needed for substantial output on a day-to-day basis. It should be obvious that the equipment required readily lends itself to monitoring and control as regards rates of feed, loading of conveyors and the speed of operation of movable devices as well as sintering temperature and ignition time. By changes of rates of feed into the mills and adjusting the weight of the grinding media such as rods or balls, the Fe concentration of the final product can be varied to a great extent.

It should now be apparent that I have provided an improved process for concentrating and agglomerating Fe-bearing materials which accomplishes the objects initially set out above. The invention resides in the disclosed methods of preparing the incoming burden for use in a sintering device operated under conditions of low temperature, maintenance, and over-all costs to provide an agglomerated product having an adequate Fe concentration. The removal of the fines from the incoming burden does not result in the loss of appreciable Fe values but does permit a closer contact of metallic particles in the sintering phase as well as the creation of a rather porous nature in the sinter bed to promote ignition.

Having thus described my invention what I claim is:

1. The method of producing agglomerated Fe concentrates for use as raw material in a steel-making furnace or vessel from an incoming burden composed of slag, metallic and oxidized iron ranging in size from 100 mesh upward, which consists of classifying said burden to remove therefrom the fines of less than approximately 8 mesh, thereby exposing and bringing into contact with one another dispersed faces of the metallics contained in said burden, sintering the remaining burden by the application thereto of heated gases in the presence of abundant oxygen and prolonging the application thereof for a sufficient length of time to effect ignition of said metallics to supply additional heat to the sinter bed and to weld said faces together to thereby produce a sinter cake, and thereafter classifying the sintered burden as to size to produce a product of predetermined minimum particle size.

2. The method of producing agglomerated Fe concentrates for use as raw material in a steel-making furnace or vessel from an incoming burden of slag, metallics and oxides ranging in size from 100 mesh upward which consists of classifying said burden to remove therefrom the fines of less than approximately 8 mesh, sintering the remaining burden by the application thereto of heated gases having a temperature of the order of 1800° F. to 1900° F. for a period of from 2 to 6 minutes and in the presence of sufficient oxygen whereby dispersed faces of the metallic particles are oxidized to supply additional heat to the sinter bed and whereby said faces are welded together to produce a sinter cake, and thereafter classifying the sintered burden as to size to produce a product of predetermined minimum particle size.

3. The method of producing agglomerated Fe concentrates for use as raw material in a steel-making furnace or vessel from an incoming burden of slag, metallics and oxides ranging in size from 100 mesh upward which consists of first impacting said burden to break away slag from metal and oxide particles thereof, thereafter removing from the burden the fines of less than approximately 8 mesh thereby exposing and bringing into contact with one another dispersed faces of the metallics contained in said burden, sintering the remaining burden in the presence of sufficient oxygen whereby said dispersed faces of the metallic particles of the burden are oxidized to supply additional heat to the sinter bed and whereby said faces are welded together to produce a sinter cake, and thereafter classifying the sintered burden as to size to produce a product of predetermined minimum particle size.

4. The method of producing an agglomerated Fe concentrate for use as raw material in a steel-making furnace or vessel from an incoming burden composed of slag, metallic iron, FeO and other oxides of iron ranging in size from 100 mesh upwardly, which consists of sintering said burden after removing therefrom the fines of less than approximately 8 mesh so as to provide a porous sinter bed for the ready passage therethrough of heated gases and oxygen, said sintering being accomplished by the application of heating gases at a temperature of the order of 1800° F. to 1900° F. for a period of from 2 to 6 minutes and in the presence of sufficient oxygen, whereby dispersed faces of the metallic particles and particles of FeO are oxidized to generate additional heat in the sinter bed to effect welding together of said faces to produce a sinter cake, breaking up the cake into particles, and thereafter classifying the sintered particles as to size to produce an end product of predetermined minimum particle size while returning the sintered fines below said size back to the sintering bed.

5. The method of producing agglomerated Fe concentrates for use as raw material in a steel-making furnace or vessel from an incoming burden of slag, metallics and oxides ranging in size from 100 mesh upwardly, which consists of classifying said burden to remove therefrom the fines of less than approximately 8 mesh thereby exposing and bringing into contact with one another dispersed faces of the metallics in said burden, depositing the remaining burden onto a bed, subjecting said bed to a temperature of the order of 1800° F. to 1900° F. in the presence of sufficient oxygen and for a sufficient length of time to effect ignition of the metallics of the burden, whereby additional heat is exothermically generated to assist in the sintering process wherein said metallics are welded together to produce a sinter cake, breaking up the sintered cake into particles, and thereafter classifying the sintered particles as to size to a product of predetermined minimum particle size.

6. The process of claim 1 including the further but initial step of subjecting the incoming burden to an impacting process to break away slag from metal and oxide particles of the burden and to pulverize said broken away slag before said fines are removed from said burden.

7. The process of claim 2 including the further but initial step of subjecting the incoming burden to an impacting process to break away slag from metal and oxide particles of the burden and to pulverize said broken away slag before said fines are removed from said burden.

8. The method of claim 3 including the further but initial step of separating the incoming burden into a first fraction having a particle size of less than approximately ½" and a second fraction having a particle size ranging between approximately ½" and 3", separately subjecting said fractions to an impacting process, and screening the impacted second fraction to add the fines of —½" size thereof to the impacted first fraction before said impacted first fraction is passed to the sintering process.

References Cited

UNITED STATES PATENTS

| | | | |
|---|---|---|---|
| 2,780,536 | 2/1957 | Carney | 75—5 |
| 2,826,487 | 3/1958 | Davis | 75—5 |
| 3,081,163 | 3/1963 | Kuzell et al. | 75—24 |

FOREIGN PATENTS 502,416   3/1939   Great Britain.

BENJAMIN HENKIN, *Primary Examiner.*